(12) United States Patent
Raymond et al.

(10) Patent No.: US 10,956,698 B2
(45) Date of Patent: Mar. 23, 2021

(54) SYSTEMS AND METHODS FOR USING MACHINE LEARNING TO DETERMINE AN ORIGIN OF A CODE

(71) Applicant: PAYPAL, INC., San Jose, CA (US)

(72) Inventors: Remo Antony Raymond, Chennai (IN); Yash Bansal, Chennai (IN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/388,270

(22) Filed: Apr. 18, 2019

(65) Prior Publication Data

US 2020/0334434 A1    Oct. 22, 2020

(51) Int. Cl.
  *G06K 7/14* (2006.01)
  *G06Q 10/08* (2012.01)
  *G06N 20/00* (2019.01)

(52) U.S. Cl.
  CPC ......... *G06K 7/1447* (2013.01); *G06K 7/1434* (2013.01); *G06N 20/00* (2019.01); *G06Q 10/0833* (2013.01)

(58) Field of Classification Search
  CPC ......... G06K 7/10; G06K 7/14; G06K 7/10722
  USPC .................. 235/462.41, 462.24, 462.01, 375
  See application file for complete search history.

(56) References Cited

U.S. PATENT DOCUMENTS

| | | | | |
|---|---|---|---|---|
| 2008/0290153 | A1* | 11/2008 | Jouvin | B07C 3/18 235/375 |
| 2012/0151293 | A1* | 6/2012 | Beals | G06K 7/1095 714/755 |
| 2015/0302421 | A1* | 10/2015 | Caton | G06F 21/36 705/17 |
| 2015/0324741 | A1* | 11/2015 | Parry | G06Q 10/08 705/333 |
| 2017/0052983 | A1* | 2/2017 | Pearlman | G06K 9/46 |
| 2018/0330258 | A1* | 11/2018 | Harris | G06N 3/006 |
| 2019/0362197 | A1* | 11/2019 | Jain | G06N 3/08 |

* cited by examiner

Primary Examiner — Edwyn Labaze
(74) Attorney, Agent, or Firm — Haynes and Boone, LLP

(57) ABSTRACT

Methods and systems for using machine learning to determine an origin of an alphanumeric code are presented. The code is analyzed to determine a set of characteristics based on the values and the types of values within the code. The code and the set of characteristics may then be embedded into an image. To embed the code and the set of characteristics into an image, each of the code and the set of characteristics may be converted into a corresponding set of pixel values. The pixel values may then be combined to form the pixels in the image. The image is provided to a machine learning model as input. The machine learning model is configured to use the image to determine at least one entity that is associated with the code.

20 Claims, 8 Drawing Sheets

| Tracking No. | Image Representation |
|---|---|
| 9400109699937760480063 | ▊ 508 |
| 7489098235154154119 | ▊ 510 |
| LS945901959CN | ▊ 512 |

SYSTEMS AND METHODS FOR USING MACHINE LEARNING TO DETERMINE AN ORIGIN OF A CODE

BACKGROUND

The present specification generally relates to code analysis, and more specifically, to using machine learning to determine an origin of an alphanumeric code according to various embodiments of the disclosure.

RELATED ART

Alphanumeric codes have been widely used by entities, such as merchants, manufacturers, shipping couriers, and others, for identifying various items such as products, services, or shipments. An example of such alphanumeric codes are tracking codes (or tracking numbers) issued by shipping couriers. Each courier may have a proprietary scheme for generating and/or managing its set of tracking codes. When a shipment is created with a courier, a tracking code may be generated and/or obtained for such a shipment. The tracking code may then be used by other parties, such as a merchant, a consumer, a payment service provider, etc. to track/monitor a location and/or a status of the shipment with the courier.

Unfortunately, the tracking information (e.g., the tracking code, the courier identity) provided by the merchant may not always be correct, which may lead to the inability for the parties (e.g., the consumer, the payment service provider, etc.) to track the shipment. For example, the courier identity provided by the merchant may refer to an incorrect courier (not the one that generates the tracking number), the tracking code may be missing one or more values, the tracking code may be incorrect, etc. In fact, it has been observed that over 30% of the tracking information provided by merchants include incorrect information. Thus, there is a need for determining an origin of an alphanumeric code (e.g., a courier) based on the code (e.g., a tracking number) such that any one of the parties involved in the transaction may be able to obtain shipment information even when incorrect tracking information is provided by the merchant.

BRIEF DESCRIPTION OF THE FIGURES

FIG. 5 illustrates additional images generated based on alphanumeric codes according to an embodiment of the present disclosure;

Figure 1:
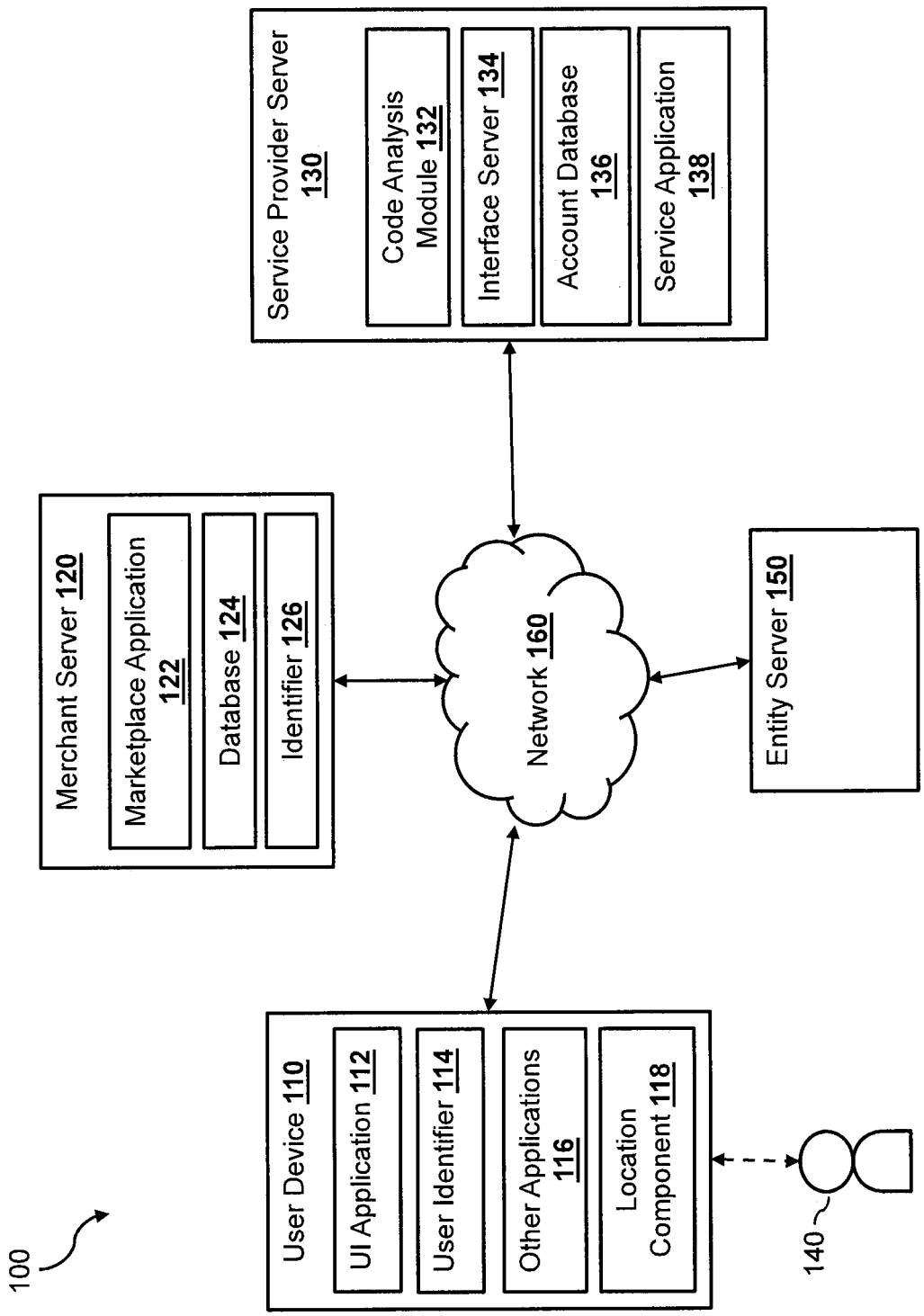
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for using machine learning to determine an origin of an alphanumeric code (also referred to as a "code"). An alphanumeric code is a code that includes a string (e.g., a sequence) of values, where each value in the string can be one of a letter, a numeral, or a special character (including symbols) (e.g., a '@' character, a '#' character, a '&' character, etc.). As discussed above, alphanumeric codes have been widely used by entities to identify items, such as products, services, or shipments. For example, a manufacturer may use alphanumeric codes to identify different products it manufactures. A retailer may use alphanumeric codes to identify different products in its inventory. A shipping courier may use alphanumeric codes to identify different shipments.

However, since different entities may generate and manage their codes independent from each other (and often use proprietary schemes for generating and managing their codes), the codes generated by different entities may not compatible with each other. For example, an alphanumeric code generated by one entity for identifying a particular item may not be used by another entity to identify the item. The codes generated and managed by different entities may be completely distinct from each other or may be partially overlapping (e.g., when two entities use identical or similar schemes for generating the codes, etc.). However, even when a code is shared between two entities, the code may refer to different items by the two entities such that the code may be associated with a first item by a first entity, but may be associated with a different, second item by a second entity. In other words, only the associated entity (also known as the origin) of the code (e.g., a particular manufacturer, a particular retailer, a particular shipping courier, etc.) is able to identify an item based on the code.

One example of such alphanumeric codes are tracking numbers (or tracking codes). Typically, a tracking code is issued by a shipping courier when a new shipment is initiated. For example, when a consumer purchases an item online from a merchant via a website, the merchant may initiate a shipment for shipping the item to the consumer with a shipping courier, which the merchant or consumer selects from different available shipping couriers. The shipping courier may then issue a tracking code for identifying the shipment. The tracking code may then be used by various parties, such as the consumer, the merchant, the payment service provider, etc. to monitor and/or track a location and/or status of the shipment. Thus, the merchant may provide the consumer with tracking information that includes the tracking code and an identity of the shipping courier once the shipment for the item is created. The consumer may then use the tracking code to track/monitor the shipment with the courier so that the consumer can determine when the item is expected to arrive, whether the item is lost, whether an attempt to deliver the item was performed, whether the item is returned to the sender, etc. The tracking information may also be provided by the merchant to the payment service provider that facilitates a payment for the purchase. Similar to the consumer, the payment service provider may also use the tracking number to track/monitor a location and/or a status of the shipment with the courier. Furthermore, the payment service provider may perform one or more actions, such as withholding funds from the merchant, releasing funds to the merchant, and/or refunding to the consumer, based on the location and/or the status of the shipment.

Since the tracking codes are proprietary to the corresponding couriers (e.g., each courier generates and manages its own tracking codes), a tracking code needs to be paired with the correct courier identity in order to obtain correct shipment information. For example, the consumer needs to provide the tracking code to the corresponding courier (e.g., the courier's website) in order to retrieve shipment information of the shipment. Alternatively, the payment service provider may use an application programming interface (API) to access the shipment information from the courier's server based on the tracking code, or alternatively, may use a third-party vendor to obtain the tracking information based on a combination of the tracking code and the courier identity. Providing the tracking code to a different courier (e.g., a website of a different courier, a server of a different courier, etc.) or providing an incorrect combination of a tracking number and a courier identity may not yield any or correct shipment information.

When the tracking information provided by the merchant includes incorrect information (e.g., an incorrect courier's identity), the consumer and/or the payment service provider may not be able to track the shipment. Thus, according to various embodiments of the disclosure, a code analysis system may use a computer-based machine learning model to determine a probability that a code is associated with an entity based on the code. For example, the code analysis system may be configured to use the machine learning model to determine a probability that the tracking number is associated with a particular shipping courier. The computer-based machine learning model may be implemented using one of a variety of computer models, such as an artificial neural network, a regression model, a decision tree, etc.

As discussed above, it may be difficult to determine the associated entity (e.g., the origin) based on the values of the code themselves. However, since each entity may use one or more schemes to generate the codes, the codes generated by each entity may follow one or more patterns corresponding to the one or more schemes. Thus, when a code is received by the code analysis system, the code analysis system may derive a set of characteristics from the code, which may help the code analysis system to detect one or more patterns within the code. In some embodiments, the set of characteristics may include at least one of a length of the code, a ratio between a first type of value (e.g., letters in an alphabet) and a second type of value (e.g., numerals) in the code, and a distribution among different types of values (e.g., alphabetic letters, numerals, special characters, etc.) in the code. In some embodiments, the code analysis system may configure and train the machine learning model to receive the code and/or the set of characteristics derived from the code and to output a likelihood (e.g., a probability) that the code is associated with a particular entity (e.g., a particular shipping courier, etc.) based on the set of characteristics.

However, it has been observed that it may be easier and more accurate for the machine learning model to detect or recognize patterns in an image format than in a code format. Thus, in some embodiments, instead of using the code and/or the set of characteristics as input variables for the machine learning model, the code analysis system may first embed information of the code (e.g., the code itself and the set of characteristics) into an image and use the image as the input variable for the machine learning model. The image can be either a vector image (e.g., an ai file, a pdf file, etc.) or a raster image (e.g., a jpg file, a png file, etc.) For example, the code analysis system of some embodiments may convert each value in the code and each characteristic into a corresponding pixel value. The code analysis system may then combine the pixel values corresponding to the code and the set of characteristics to form the image before providing the image to the machine learning model. The code analysis system may also train the machine learning model to predict an associated entity (e.g., an origin of the code) or determine a probability that the code is associated with an entity based on the image. It has been observed that using the image derived from the code to predict the origin of the code can yield high prediction accuracy (e.g., over 95%).

FIG. 1 illustrates an electronic transaction system 100 according to one embodiment of the disclosure. The electronic transaction system 100 includes a service provider server 130, a merchant server 120, an entity server 150, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to an account to access services and conduct electronic transactions (e.g., perform an online purchase transaction, etc.) with the merchant server 120. Furthermore, the user 140 may also use the user device 110 to log in to a user account to access account services or conduct electronic transactions (e.g., account transfers or payments such as performing a payment for the online purchase transaction) with the service provider server 130. After the user 140 has completed the online purchase transaction, the merchant associated with the merchant server 120 may create a shipment for an item associated with the purchase and may provide a tracking number to the user 140 via the user device 110 and to the service provider server. The user 140 and/or the service provider server 130 may then submit a request to the entity server 150 for shipment information (e.g., a location, a status, etc.) of the shipment based on the tracking number.

Similarly, a merchant associated with the merchant server 120 may use the merchant server 120 to log in to a merchant account to access account services or conduct electronic transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., online payment transactions, etc.) with the merchant server 120, the entity server 150, and/or the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the merchant server 120, the entity server 150, and/or the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the user identifier 114 may be passed with a user login request to the service provider server 130 via the network 160, and the user identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning.

Even though only one user device 110 is shown in FIG. 1, it has been contemplated that one or more user devices (each similar to user device 110) may be communicatively coupled with the merchant server 120, the entity server 150, and the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. In some embodiments, the marketplace application 122 may include a web server for hosting a website associated with the merchant server 120. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the entity server 150, the service provider server 130, and the user device 110 via the network 160 in the system 100.

The courier server 150, in various embodiments, may be maintained by an entity that generates and manages a set of codes. Examples of such entities include manufacturers, retailers, shipping couriers, and others that may use codes to identify items such as products, services, or shipments. The entity server 150 may include an interface (e.g., a web interface generated by a web server, an application programming interface (API), etc.) that enables other parties, such as the user 140, the merchant server 120, and the service provider server 130 to obtain information about an item (e.g., information about a product, a service, or a shipment, etc.) based on a code. Even though only one entity server 150 is shown in FIG. 1, it has been contemplated that one or more entity servers (each similar to entity server 150) associated with different entities may be communicatively coupled with the merchant server 120, the service provider server 130, and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to provide an interface (e.g., a web interface, a mobile app interface, etc.) to users. For example, the interface server 134 may include a web server configured to serve web content in response to HTTP requests. As such, the web server 134 may include pre-generated web content ready to be served to users. In another example, the interface server 134 may include an application server that is configured to provide an interface on an application (e.g., a mobile application) running on the user device 110 via an API (e.g., RESTAPI, etc.). The interface server 134 may store a log-in page and is configured to serve the log-in page to users for logging into user accounts of the users to access various service provided by the service provider server 130. The interface server 134 may also include other electronic pages associated with the different services offered by the service provider server 130. As a result, a user may access a user account associated with the user and access various services offered by the service provider server 130, by generating HTTP requests directed at the service provider server 130.

In various embodiments, the service provider server 130 includes a code analysis module 132 that implements the code analysis system as discussed herein. The code analysis module 132 is configured to determine an origin (e.g., an associated entity) of a code based on the code and/or a set of characteristics derived from the code. As discussed herein, when the user 140 completes an electronic transaction (e.g., an online purchase transaction) with the merchant server 120, the merchant server 120 may create a shipment with a courier (e.g., via the entity server 150) and may provide tracking information (e.g., a code in the form of a tracking number, a courier identity, etc.) to the user device 110 and/or the service provider server 130, such that the user 140 and/or the service provider server may use the code to obtain shipment information (e.g., a location, a status, etc.) of the shipment from a courier server corresponding to the courier identity. However, as mentioned above, the tracking information provided by the merchant may not always be correct. For example, the merchant server 120 may provide an incorrect courier identity (different from the courier that generated the code), or the merchant server 120 may provide an incorrect code. Using an incorrect code or sending the code to a wrong entity server (e.g., a courier server that did not generate the code) may prevent the user 140 and/or the service provider server 130 from obtaining the shipment information of the shipment. Thus, upon receiving the tracking information from the merchant server 120, the code analysis module 132 of some embodiments may first determine whether the code is a valid code and may also determine an origin (e.g., a courier) that generated the code. In some embodiments, the code analysis module 132 may use a machine learning model to determine a correct courier identity associated with the code based on a set of characteristics derived from the code.

Figure 2:
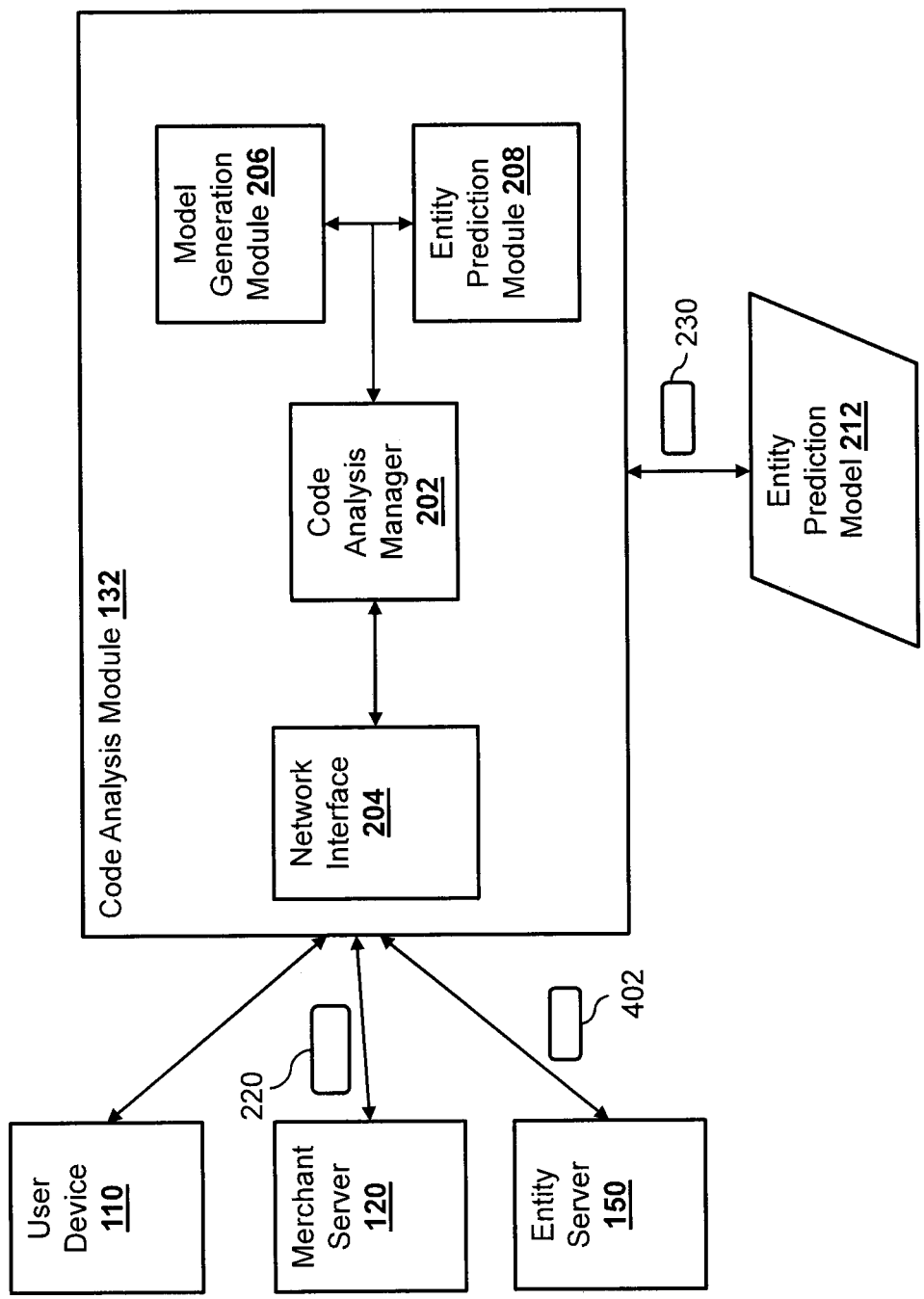
FIG. 2 is a block diagram illustrating a code analysis module according to an embodiment of the present disclosure.

FIG. 2 illustrates a block diagram of the code analysis module 132 according to an embodiment of the disclosure. The code analysis module 132 includes a code analysis manager 202, a network interface 204, a model generation module 206, and an entity prediction module 208. The code analysis manager 202 may use the model generation module 206 to generate an entity prediction model 212 based on codes previously generated by various entities (e.g., various shipping couriers). When the user 140 completes a purchase transaction for purchasing a product with the merchant server 120, the merchant server 120 may create a new shipment for shipping the item to the user 140 with the entity server 150. The entity server 150 may be associated with a particular shipping courier. The merchant server 120 may then send tracking information 220 (e.g., a tracking code, a courier identity, a country of origin of the shipment, a destination address, etc.) to the user device 110 and/or the service provider server 130. Upon receiving the tracking information 220, the code analysis module 132 may use the entity prediction module 208 to determine an origin (e.g., an associated entity) of the code based on the tracking information. In some embodiments, the entity prediction module 208 may derive a set of characteristics from the tracking code and embed the code and/or the set of characteristics in an image. The entity prediction module 208 may then use the entity prediction model 212 to determine the origin based on the image. The code analysis manager 202 may then identify an entity server (e.g., the entity server 150) based on the origin of the code predicted by the entity prediction model 212. The code analysis manager 202 may retrieve shipment information (e.g., a location of the product, a status of the shipment, etc.) from the entity server 150 based on the tracking code. In some embodiments, the code analysis manager 202 may use an interface of the entity server 150 (e.g., a web interface, an API) to retrieve the shipment information based on the tracking code.

Figure 3A:
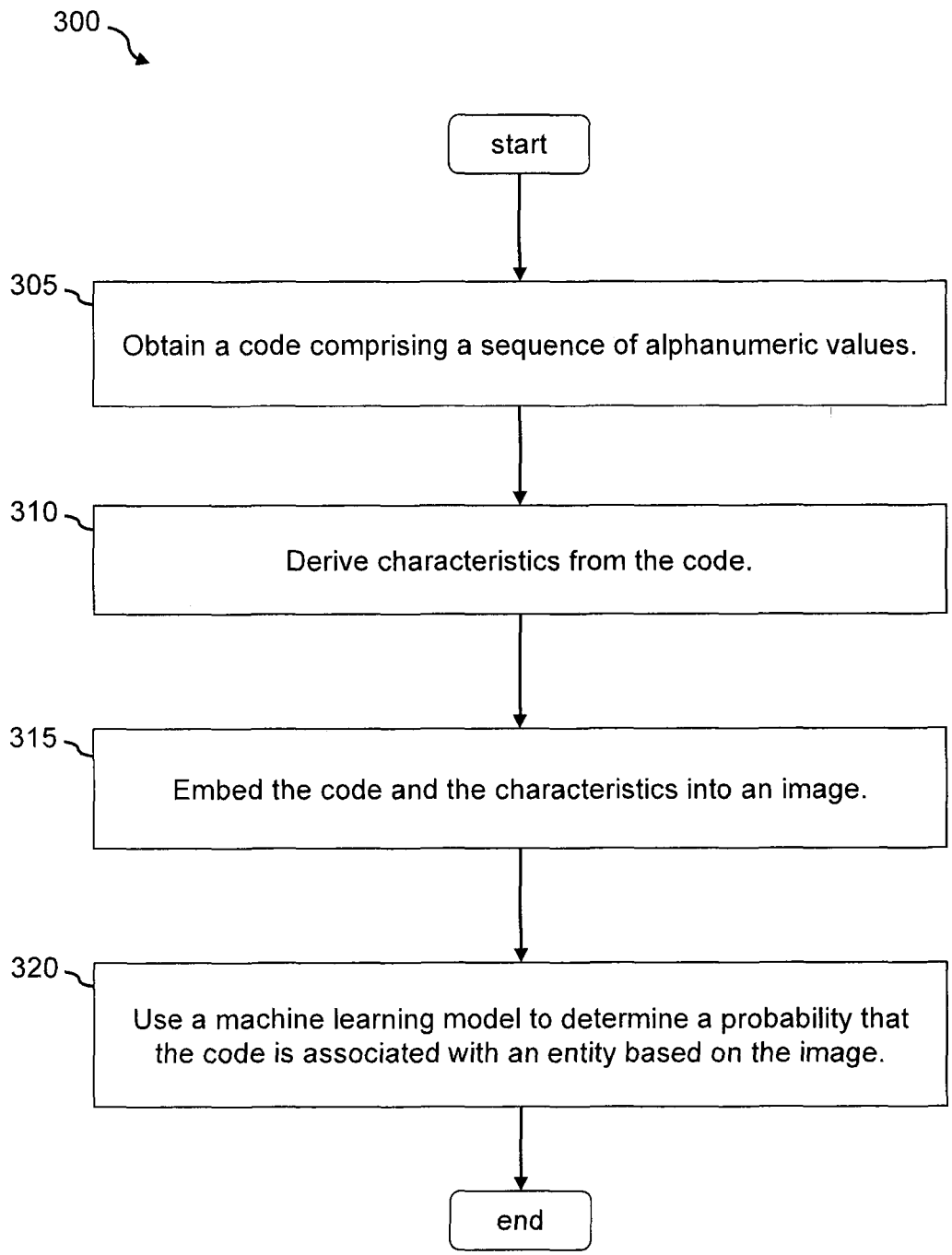
FIG. 3A is a flowchart showing a process of using a computer-based machine learning model for determining an origin of a code according to an embodiment of the present disclosure.

FIG. 3A illustrates a process 300 for using machine learning to determine an origin of a code according to an embodiment of the disclosure. In some embodiments, the process 300 may be performed by the code analysis module 132 (specifically the entity prediction module 208) of the service provider server 130. The process 300 begins by obtaining (at step 405) a code comprising a sequence of alphanumeric values. For example, once the user 140 has completed a purchase transaction with the merchant server 120 for purchasing a product from a merchant, the merchant server 120 may send a request to a courier server (e.g., the entity server 150) associated with a courier to create a shipment for shipping the product to a destination address associated with the user 140. In response to the request, the entity server 150 may initiate a shipment and may generate and/or obtain a code (e.g., a tracking code) for identifying the shipment. The entity server 150 may send the tracking code to the merchant server 120. The merchant server 120 may, in turn, transmit tracking information (e.g., tracking information 220) that includes the tracking code and an identity of a courier to the user device 110 and/or the service provider server 130.

As discussed above, there are multiple couriers that provide shipments for users and merchants alike, and they generate and manage their tracking codes independently from each other. For example, each courier may use one or more schemes to generate tracking codes for identifying its shipments. In one example, the entity server 150 may generate tracking codes using a particular scheme such that the generated tracking codes may have a particular format (e.g., two alphabetic letters, followed by three numerals, and then followed by two alphabetic letters, etc.).

In some cases, a courier may use multiple schemes for generating tracking codes. For example, the courier may use a first scheme for generating tracking codes for packages having first attributes (e.g., a first range of weights, a first range of sizes, etc.) and may use a second scheme for generating tracking codes for packages having second attributes (e.g., a second range of weights, a second range of sizes, etc.). In addition, while some couriers may use completely different schemes for generating the tracking codes, other couriers may share one or more schemes to generate the tracking codes, such that one cannot use the format of the code alone to determine the origin of the code. However, even when two couriers share the same scheme for generating the tracking codes, the tracking codes generated by the two couriers may still incompatible with each other, such that a tracking code generated by one courier may only be used to identify a shipment by that courier, and not by any other couriers. Thus, it is important that the service provider server 130 has the correct combination of tracking code and courier identity in order for it to obtain shipment information from the correct courier server based on the tracking code. However, as noted above, the tracking information (e.g., tracking information 220) provided by the merchant server 120 may not be correct, as it has been observed that over 30% of the tracking information provided by merchants include incorrect or incomplete information.

As such, in some embodiments, upon receiving the tracking information 220 from the merchant server 120, the code analysis module 132 may first determine whether the tracking information includes correct information (e.g., whether the tracking code is a valid tracking code and whether the courier identity refers to the courier associated with the code, etc.). In some embodiments, the code analysis module 132 (and specifically, the entity prediction module 208) may use machine learning to determine the origin of the code based on the tracking information 220 received from the merchant server 120. Before determining the origin of the code, the entity prediction module 208 may pre-process the tracking information before providing the tracking information to a machine learning model (e.g., the entity prediction model 212) for determining the origin of the code. In some embodiments, the process 300 derives (at step 310) a set of characteristics of the code and embeds (at step 315) the code and/or the set of characteristics in an image before providing the image to the machine learning model. For example, the code analysis manager 202 may use the entity prediction module 208 to derive a set of characteristics from the code included in the tracking information 220.

Figure 4:
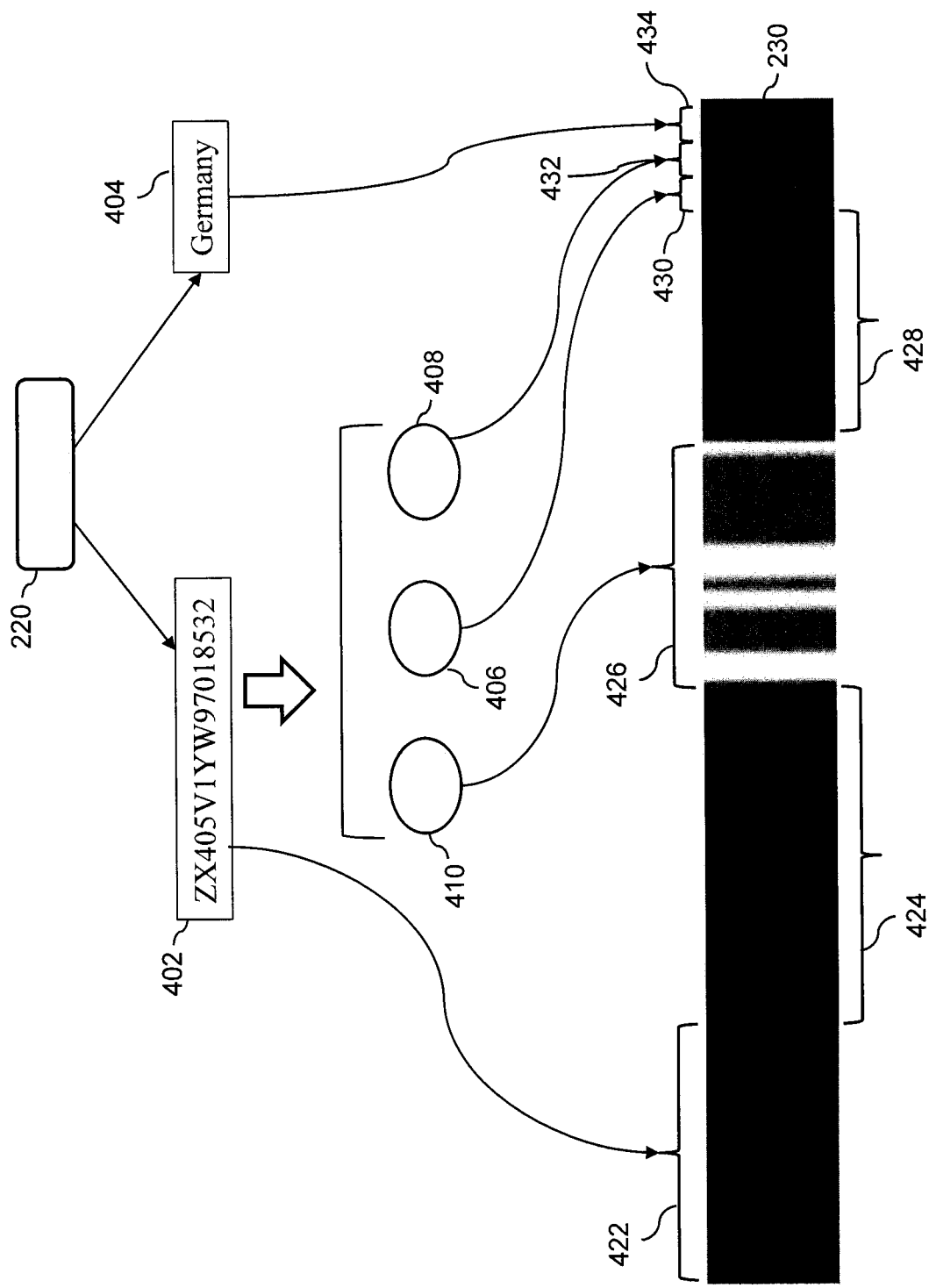
FIG. 4 illustrates an exemplary image generated based on an alphanumeric code according to an embodiment of the present disclosure.

As illustrated in FIG. 4, the tracking information 220 may include a code 402 and a country of origin 404 (e.g., the sender's country). The code 402 may comprise a string (e.g., a sequence) of alphanumeric values, where each value in the string can be one of an alphabetic letter, a numeral, or a special character (e.g., a '@' character, a '#' character, a '&' character, etc.). In this example, the code 402 may include a string 'ZX405V1YW97018532'. In some embodiments, the entity prediction module 208 may derive a set of characteristics (e.g., characteristics 406-410) based on the code 402. The set of characteristics may include a first characteristic 406 representing a length of the code 402, a second characteristic 408 representing a ratio between a first type of value (e.g., alphabetic letters) and a second type of value (e.g., numerals) in the code 402, and a third characteristic 410 representing a distribution among different types of values (e.g., alphabetic letters, numerals, special characters, etc.) in the code 402. In this example, the entity prediction module 208 may determine that the characteristic 406 has a value of 17 based on the length of the code 402. The entity prediction module 208 may also determine that the characteristic 408 has a value of 0.4166 based on the ratio between alphabetic letters and numerals (e.g., the number of alphabetic letters in the code 402 divided by the number of numerals in the code 402, etc.). The entity prediction module 208 may also determine that the characteristic 410 of the code 402 can be represented by two alphabetic letters followed by three numerals, which are followed by one alphabetic letter, which is followed by one numeral, which is followed by two alphabetic letters, and which are followed by eight numerals.

In some embodiments, the entity prediction module 208 may configure and train the entity prediction model 212 to receive the code and/or the set of characteristics derived from the code as inputs and to output a likelihood (e.g., a probability) that the code is associated with a particular entity (e.g., a particular shipping courier, etc.) based on the set of characteristics. Thus, the code analysis manager 202 may provide the code 402 and the derived set of characteristics 406-410 to the entity prediction model 212 for generating a likelihood that the code 402 is associated with a particular entity (e.g., a particular courier).

However, a machine learning model may be able to detect or recognize patterns in an image more accurately and efficiently than detecting and/or recognizing patterns in a code (e.g., a string of values). It has been observed that using the image derived from the code to predict the origin of the code may yield a high prediction accuracy (e.g., over 95%).

Thus, in some embodiments, instead of using the code and/or the set of characteristics as input variables for the machine learning model, the entity prediction module 208 may first embed the code 402 and the set of characteristics 406-410 into an image (e.g., an image 230) and use the image 230 as the input variable for the entity prediction model 212. For example, the entity prediction module 208 of some embodiments may convert each value in the code 402 and each characteristic from the set of characteristics 406-410 into one or more corresponding pixel values. The entity prediction module 208 may then combine the pixel values corresponding to the code 402 and the set of characteristics 406-410 to form the image 230 before providing the image 230 to the entity prediction model 212.

Different embodiments may use different techniques to convert the values in the string 402 and the set of characteristics 406-410 into pixel values. In some embodiments, in order to convert the code 402 into pixel values, the entity prediction module 208 may assign different pixel values (e.g., values between 0 and 255 for a luminosity channel of the image 230) to different alphabetic letters, different numerals, and different special characters. In one particular example, the entity prediction module 208 may use the corresponding code according to the American Standard Code for Information Interchange (ASCII) encoding method to convert the values in the alphanumeric code 402 into pixel values. Thus, the entity prediction module 208 may convert the code 402 ("ZX405V1YW97018532") into a string of pixel values including '90' (the ASCII code for 'Z'), '88' (the ASCII code for 'X'), '52' (the ASCII code for '4'), '48' (the ASCII code for '0'), '53' (the ASCII code for '5'), '86,' '49,' '89,' '87,' '57,' '55,' '48,' '49,' '56,' '53,' '51,' and '50, representing the ASCII codes for the values in the code 402. Instead of using the ASCII code, the entity prediction module 208 of some embodiments may use any type of standardized encoding method (e.g., UNICODE, etc.) or any type of non-standard, proprietary encoding method to convert the code 402 into a string of pixel values.

In some embodiments, the entity prediction module 208 may use the values of the characteristic 406, representing the length of the string 402, (e.g., the value '17' for the string 402) and the characteristic 408, representing a ratio between the alphabetic letters and the numerals, (e.g., the value '0.4166') as the pixel values for the characteristics 406 and 408. In other embodiments, the entity prediction module 208 may use a predetermined mapping to map the length of the string 402 and the ratio to other pixel values. For example, the entity prediction module 208 may normalize the length of the string 402 based on the pixel values of the color channel of a color space. For example, when the channel has a maximum of 256 pixel values, the entity prediction module 208 may convert the length of the string 402 to the pixel values based on the length of the string 402 in relation to a predetermined maximum length (e.g., 39). Thus, the pixel value determined for the length of the string 402 may be 111.6 (e.g., length of the string 402/the predetermined maximum length*the number of pixel values in the channel). Similarly, the entity prediction module 208 may normalize the ratio and determine the pixel value as 106.6 (the ratio*the number of pixel values in the channel). The normalized values enable maximum utility of the corresponding pixel values across the range of pixel values.

To convert the characteristic 410, representing the distribution of the different types of values (e.g., alphabetic letters and numerals, etc.) in the string 402, into one or more pixel values, the entity prediction module 208 of some embodiments may first assign different pixel values to different types of values in the string 402. For example, the entity prediction module 208 may assign a first pixel value (e.g., a value of 255 in the luminosity channel of the image 230) to a first type of value in the code 402 (e.g., alphabetic letter values) and may assign a second pixel value (e.g., a value of 127 in the luminosity channel of the image 230) to a second type of value in the code 402 (e.g., numeral values). The entity prediction module 208 may then convert the characteristic 410 into pixel values by converting each value in the code 402 to its assigned pixel value based on its type of value (e.g., whether the value is an alphabet or a numeral, etc.). As such, since the code 402 has a distribution of alphabetic letter-alphabetic letter-numeral-numeral-numeral-alphabetic letter-numeral-alphabetic letter-alphabetic letter-numeral-numeral-numeral-numeral-numeral-numeral-numeral-numeral, the entity prediction module 208 may determine the pixel values for the characteristic 410 as "255, 255, 127, 127, 127, 255, 127, 255, 255, 127, 127, 127, 127, 127, 127, 127, 127."

Although in the example illustrated above, the code 402 and the characteristics 406-410 have been embedded into the image 230 by converting them into pixel values along the luminosity channel of the image 230, in some embodiments, the code 402 and the characteristics 406-410 may be embedded into the image 230 using different techniques. For example, instead of converting the code 402 and the characteristics 406-401 into pixel values along the same channel, the entity prediction module 208 may embed different information related to the code 402 into different channels of a color space. In one non-limiting example, the entity prediction module 208 may embed the code 402 into a first color channel (e.g., the red channel in a red-green-blue (RGB) color space), may embed the characteristic 410 into a second color channel (e.g., the green channel in the RGB color space), and may embed the characteristics 406 and 408 into a third color channel (e.g., the blue channel in the RGB color space) of the image 230.

The entity prediction module 208 may then combine the pixel values determined for the code 402 and the set of characteristics 406-410 to form the image 230. In some embodiments, when the pixel values are all in the same channel (e.g., the luminosity channel), the entity prediction module 208 may generate a pixel of the image 230 based on each pixel value determined from the code 402 and the set of characteristics 406-410. When the code 402 and the set of characteristics 406-410 are converted into pixel values along different channels (e.g., different color channels) in the image 230, the entity prediction module 208 may generate each pixel in the image 230 by combining pixel values along the different color channels.

In some embodiments, since different codes (e.g., from different origins) may have different lengths, the entity prediction module 208 may also insert additional padding pixels into the image 230, such that the resulting images from different codes having different lengths may have the same size (e.g., the same number of pixel values). The padding pixels can be of any predetermined pixel values. In some embodiments, the padding pixel value is one that is different from any other pixel values that may be used for representing the string 402 and/or the set of characteristics. For example, the entity prediction module 208 may use the pixel value '0' for the padding pixel.

In one particular example, the entity prediction module 208 may generate the image 230 by first using the pixel values corresponding to the code 402 to generate a first set of pixels (as indicated by a portion 422 of the image 230) for the image 230. The entity prediction module 208 may then add (e.g., append to the pixel values corresponding to the code 402) a number of padding pixels to the image 230 such that the sum of the number of pixel values corresponding to the code 402 and the number of padding pixels equals a predetermined number of pixels. In one example, the predetermined sum of pixels is 39. Since the number of pixels corresponding to the code 402 is 17, the entity prediction module 208 may add 22 padding pixels (each having a pixel value of '0') to the image 230 (as indicated by a portion 424 of the image 230).

The entity prediction module 208 may then add another set of pixels using the pixel values corresponding to the characteristic 410 (e.g., "255, 255, 127, 127, 127, 255, 127, 255, 255, 127, 127, 127, 127, 127, 127, 127, 127") to the image 230 (as indicated by a portion 426) of the image 230. The entity prediction module 208 may also append a number of padding pixels (e.g., 22) to the end of the portion 426 (as indicated by a portion 428 of the image 230). The entity prediction module 208 may then add another set of pixels (as indicated by portions 430 and 432) using the pixel value corresponding to the characteristic 406 (e.g., '17') and the pixel value corresponding to the characteristic 408 (e.g., '0.4166') to the image 230. While the entity prediction module 208 generates the image 230 in this example by placing the pixel values corresponding to the code 402 first, and then the characteristic 410, which is followed by the characteristics 406 and 408, the entity prediction module 208 of some embodiments may generate the image 230 by placing the pixel values corresponding to the code 402 and the characteristics 406-410 in different orders (e.g., characteristic 410—characteristic 406—code—characteristic 408, etc.).

In the example where the code 402 represents a tracking code associated with a shipping courier, the country where the shipment is originated from (e.g., is shipped from) may be an important piece of information for determining the identity of the courier associated with the code 402. The information regarding the country of origin may be included in the tracking information 220 (e.g., the country 404). As such, in some embodiments, the entity prediction module 208 may also embed the information regarding the country of origin 404 into the image 230. For example, the entity prediction module 208 may assign different pixel values (not used for any other purposes discussed herein) to different countries, and may add the pixel value corresponding to the country 404 at the end of the image 230. In this example, the entity prediction module 208 may determine from the code 220 that the country of origin 404 is Germany, and may have assigned the pixel value '2' to the country Germany. Thus, the entity prediction module 208 may append the pixel value '2' to the end of the image 230 (as indicated by a portion 434). In this example, the entity prediction module 208 has generated the image 230 comprising pixel values ('90,' '88,' '52,' '48,' '53,' '86,' '49,' '89,' '87,' '57,' '55,' '48,' '49,' '56,' '53,' '51,' '50,' '0,' '0,' '0,' '0,' '0,' '0,' '0,' '0,' '0,' '0,' '0,' '0,' '0,' '0,' '0,' '0,' '0,' '0,' '0,' '0,' '255,' '255,' '127,' '127,' '127,' '255,' '127,' '255,' '255,' '127,' '127,' '127,' '127,' '127,' '127,' '127,' '127' '0,' '0,' '0,' '0,' '0,' '0,' '0,' '0,' '0,' '0,' '0,' '0,' '0,' '0,' '0,' '0,' '0,' '0,' '0,' '0,' '0,' '0,' '0,' '17,' '0.4166,' and '2').

The example illustrated above embeds the country of origin 404 characteristic into a single pixel. One disadvantage of such an embodiment is that the single pixel may not affect (e.g., change) the image sufficiently to reflect the importance of this characteristic, as different countries of origin can be a significant factor in determining whether two codes (while similar or even identical in other aspects) are the same code (or associated with the same entity, such as from the same shipping courier). As such, in some embodiments, the entity prediction module 208 may embed the country of origin 404 characteristic into a plurality of pixels. In one example, the entity prediction module 208 may allocate a number of pixels that correspond to the number of countries available. Thus, when there are 10 available countries, the entity prediction module 208 may allocate 10 pixels for the country of origin 404 characteristic, where each pixel corresponds to a distinct country. When the entity prediction module 208 determines that the country of origin 404 indicates a particular country (e.g., Germany), the entity prediction module 208 may assign a particular pixel value (e.g., 127) to the pixel corresponds to that particular country (e.g., Germany), and may assign a different pixel value (e.g., 0) to other pixels. If the country Germany corresponds to the second pixel, and the country of origin 404 indicates the country, Germany, the entity prediction module 208 may generate an array of pixels (0, 127, 0, 0, 0, 0, 0, 0, 0, 0). The entity prediction module 208 may then incorporate the array of pixels into the image 230.

Although as shown in FIG. 4 the image 230 generated for the code 220 is a one-dimensional image, in some embodiments, the entity prediction module 208 may generate the image 230 as multi-dimensional (e.g., two-dimensional). For example, the entity prediction module 208 may generate the image 230 as a two-dimensional image by forming a two-dimensional array of pixels based on the pixel values (e.g., each row includes a fixed number of pixels such as 39 pixels). Using a multi-dimensional (e.g., two-dimensional) image may enable a computer-based machine learning model (e.g., the entity prediction model 212) to detect patterns (e.g., multi-dimensional patterns, etc.) that the model would not have detected based on a less-dimensional image (e.g., a one-dimensional image), by for example, using an edge detection algorithm such as a Scale Variant Feature Transform (SIFT). However, more computer resources may be required for the entity prediction module 208 to analyze the image when the image has more dimensions.

FIG. 5 illustrates other example images generated by the entity prediction module 208 based on the corresponding codes using the techniques disclosed herein. For example, the entity prediction module 208 may generate an image 508 based on the tracking code 502, may generate an image 510 based on the tracking code 504, and may generate an image 512 based on the tracking code 506 using the techniques disclosed herein.

After embedding the code and the characteristics into the image, the process 300 then uses (at step 320) a machine learning model to determine a probability that the code is associated with an entity based on the image. For example, the entity prediction module 208 may provide the image 230 (e.g., the pixel values of the image 230) to the entity prediction model 212 as input values. In another example, the entity prediction module 208 may provide the pixel values of the image 230 in another format, such as an array of numerals, an XML file including the pixel values, etc. In some embodiments, the entity prediction model 212 may be a computer-based machine learning model. The entity prediction model 212 may be implemented using one or more machine learning structure, such as an artificial neural network, a regression model, a decision tree, etc. In some embodiments, the entity prediction model 212 may be trained using training data, such as using codes that have been previously generated and associated with corresponding entities, and configured to recognize one or more patterns in the input values to generate a probability that the code is associated with a particular entity. Based on the training data, the entity prediction model 212 may learn about different patterns in different codes, and may associate different patterns with different entities. For example, the entity prediction model 212 may learn that a longer length (e.g., exceeding a predetermined number of pixels such as 20) of the padding portion (e.g., the portion 424, the portion 428) in combination with a particular pattern of white (e.g., pixel values of '255') and grey (e.g., pixel values of '127') in the portion 426 may indicate a high or higher likelihood that the code 402 is associated with a first entity, while a shorter length (e.g., below the predetermined number of pixels) of the padding portion (e.g., the portion 424, the portion 428) in combination with the same particular pattern of white and grey in the portion 426 may indicate a high or higher likelihood that the code 402 is associated with a second entity.

Thus, based on using the image 230 as input values, the entity prediction model 212 may be configured to provide an outcome indicating a likelihood (e.g., a percentage) that the code 402 is associated with a particular entity (e.g., a particular shipping courier). In some embodiments, the entity prediction model 212 may be configured to generate an outcome that indicates the particular entity having the highest likelihood among multiple entities (e.g., the shipping courier among different shipping couriers having the highest chance of generating the code 402). In some embodiments, the entity prediction model 212 may be configured to generate an outcome that indicates a subset of entities (e.g., 5 entities out of a total of 50 entities) having the highest likelihood among the multiple entities to be associated with the code 402) and their corresponding probability. Based on the outcome determined by the entity prediction model 212, the code analysis manager 202 may then identify an entity server (e.g., the entity server 150) among different entity servers based on the identity of a particular entity, and may transmit a request for information to the entity server 150 based on the code 220. In the example where the code 220 is a tracking code from the particular shipping courier, the code analysis manager 202 may transmit a request for shipment information based on the code 220. In the example where the code 220 is a serial number of a product manufactured by a particular manufacturer, the code analysis manager 202 may transmit a request for product information of the product based on the code 220. Using the techniques disclosed herein to determine the origin of the code (e.g., the entity that is associated with the code), the service provider server 130 may obtain information (e.g., shipment information, product information, etc.) from the entity server 150 based on the code even if the information provided by the merchant server 120 is incorrect (e.g., incorrect courier information, etc.). Based on the information (e.g., shipment information) obtained from the entity server 150, the service provider server 130 may then perform an action regarding the transaction between the consumer 140 and the merchant. For example, when it is determined that the item has failed to be delivered to the intended address, the service provide server 130 may initiate a refund back to the consumer 140. On the other hand, when the service provider server 130 determines, based on the information obtained from the entity server 150, that the item has been successfully delivered to the intended address, the service provider server 130 may release funds associated with the transaction to the merchant.

While the examples illustrated above refer to the code 402 as a tracking code used by a shipping courier, the techniques disclosed herein can be used to determine the origin of the code when the code is used for other purposes as well, such as a serial number of a product used by a manufacturer, a product code for a merchandise used by a retailer, etc. For example, a law enforcement unit may discover evidence that includes a serial number of a product, but information regarding the product and/or the manufacturer of the product is unavailable. Thus, the law enforcement unit may use the code analysis system as described herein to determine an origin of that serial number (e.g., a particular product manufacturer), and the may then contact the particular product manufacturer to obtain product information associated with a product identified by the serial number.

Figure 3B:
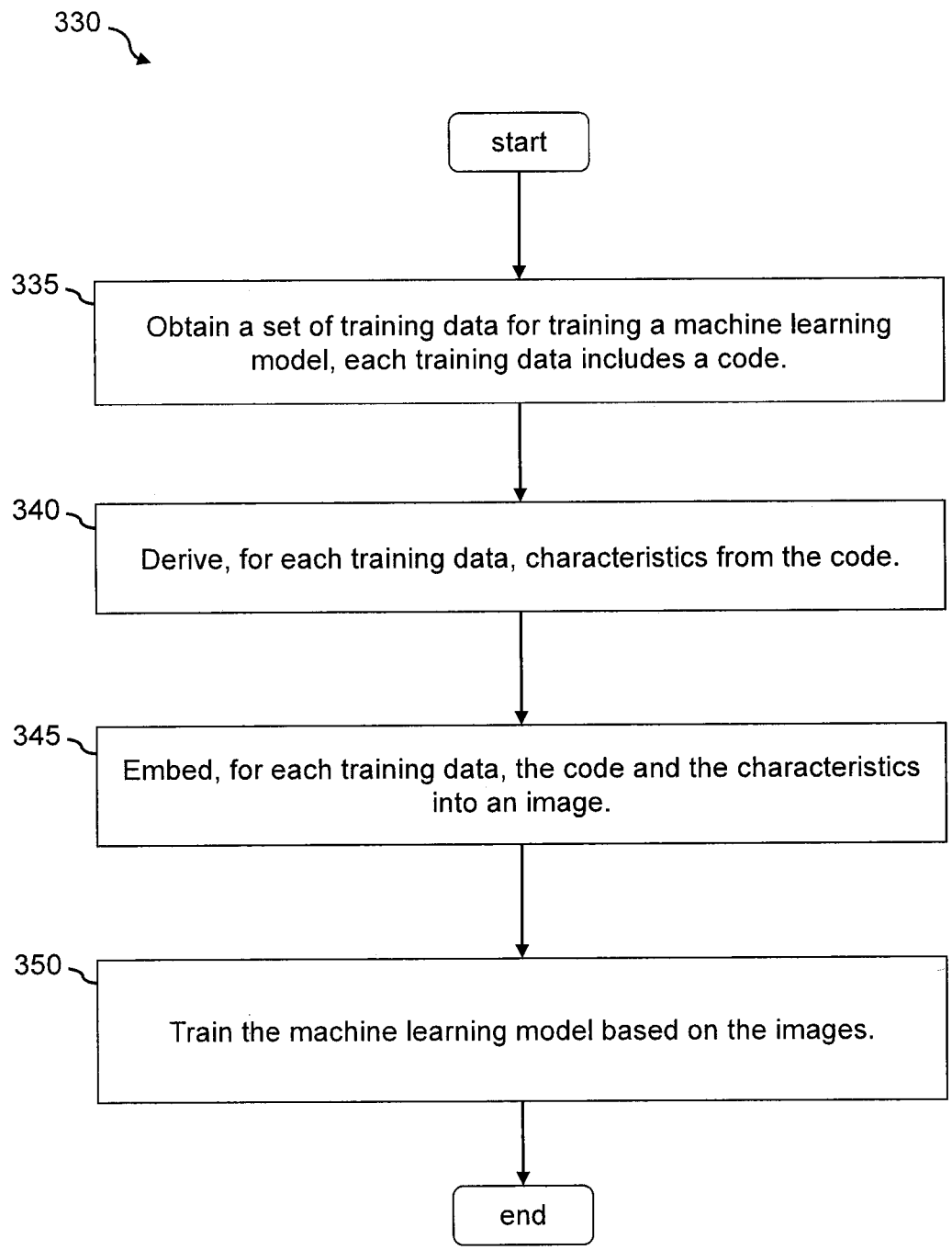
FIG. 3B is a flowchart showing a process of training a computer-based machine learning model for determining an origin of a code according to an embodiment of the present disclosure.

FIG. 3B illustrates a process 330 for training a machine learning model to determine an origin of a code according to an embodiment of the disclosure. In some embodiments, the process 330 may be performed by the code analysis module 132 (specifically the model training module 206) of the service provider server 130. The process 330 begins by obtaining (at step 335) a set of training data for training the machine learning model. For example, the model generation module 206 may obtain codes (e.g., tracking codes, etc.) that have been previously generated and/or used by various entities (e.g., various shipping couriers) in the past. In some embodiments, each training data may include a code (e.g., a tracking code) and may be labeled with an identity of the origin of the code (e.g., the shipping courier that generated the code, etc.).

The process 330 then, for each training data, derives (at step 340) characteristics from the code and embeds (at step 345) the code and/or the characteristics into an image. For example, the model generation module 206 may derive a set of characteristics for each code in the set of training data. The set of characteristics derived from each code may include a length of the code, a ratio between a first type of value (e.g., alphabetic letters) and a second type of value (e.g., numerals) in the code, and a distribution among different types of values (e.g., alphabetic letters, numerals, special characters, etc.) in the code. The model generation module 206 may then embed the code, the set of characteristics, and any addition information (e.g., the sender's country, etc.) in an image using similar techniques as described above in step 315 of FIG. 3A.

The process 330 then trains (at step 350) the machine learning model based on the images. For example, the model generation module 206 may generate and/or obtain a machine learning model (e.g., the entity prediction model 212) for determining an origin of a code. As described herein, the machine learning model can be at least one of an artificial neural network, a regression model, a decision tree, etc. The machine learning model can be trained with training data to perform the entity prediction functionality based on a code. Thus, the model generation module 206 may provide the resulting images generated from the codes to the machine learning model to train the machine learning model.

Figure 6:
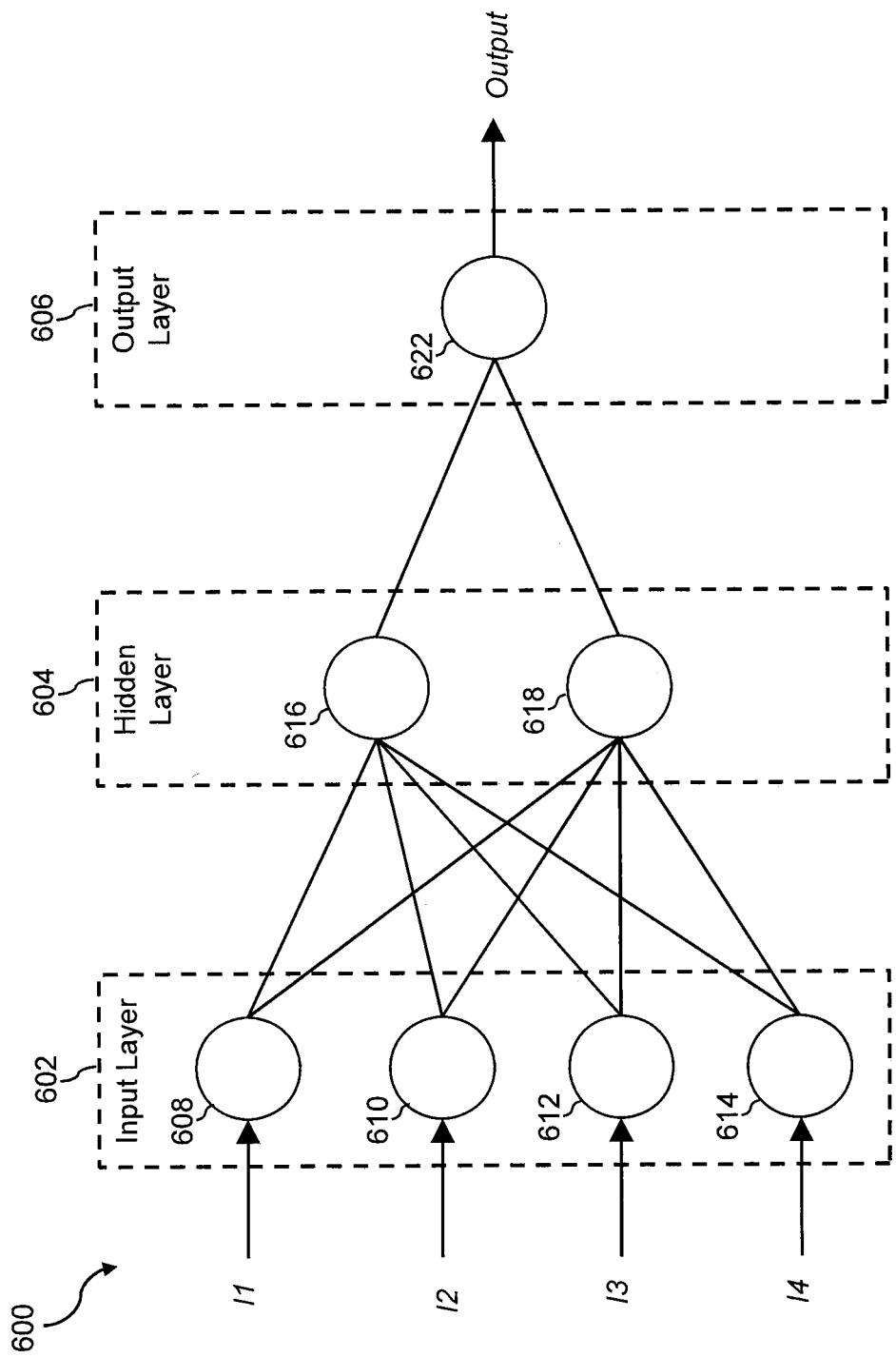
FIG. 6 illustrates another exemplary artificial neural network according to an embodiment of the present disclosure.

FIG. 6 illustrates an example artificial neural network 600 that may be used to implement the entity prediction model 212 generated by the model generation module 206. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the entity prediction module 212 may include as many hidden layers (e.g., 50, 80, etc.) as necessary.

In this example, the artificial neural network 600 receives a set of input values and produces an output value. Each node in the input layer 602 may correspond to a distinct input value. For example, when the artificial neural network 600 is used to implement the entity prediction model 212, each node in the input layer 602 may correspond to a distinct value in the code 402 or a distinct characteristic. In some embodiments, when the entity prediction model 212 is configured to determine an origin of a code based on an image generated from the code, each node in the input layer 602 may correspond to a distinct pixel in the image 230. Even though only four nodes are shown in the input layer 602, any number of nodes can be included in the artificial neural network 600. For example, when the input of the entity prediction model 212 is an image (e.g., the image 230), the input layer 602 may include as many nodes as the number of pixels in the image 230, such that each node in the input layer 602 may correspond to a pixel value of the image 230. In a non-limiting example, the node 608 may correspond to a first pixel of the image 230, the node 610 may correspond to a second pixel of the image 230, the node 612 may correspond to a third pixel of the image 230, the node 614 may correspond to a fourth pixel of the image 230, and so forth.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that the nodes 616-618 may produce different values based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 500 is used to implement the entity prediction model 212, the output produced by the artificial neural network 600 may include an identity of an entity (having the highest probability to be associated with the code) and a probability that the code is associated with that entity. Although it is shown that the output layer 606 only includes one node 622, the output layer 606 of the artificial neural network 600 of some embodiments may include multiple nodes (e.g., 5 nodes). In such an embodiment, the output layer 606 may be configured to produce identities of several entities (e.g., the 5 entities having the highest probability to be associated with the code, etc.).

The artificial neural network 600 may be trained by using training data. By providing training data to the artificial neural network 600, the nodes 616-618 in the hidden layer 604 may be trained (adjusted) such that an optimal output (e.g., an entity identification) is produced in the output layer 606 based on the training data. By continuously providing different sets of training data, and penalizing the artificial neural network 600 when the output of the artificial neural network 600 is incorrect (e.g., when the output entity identity does not match the entity associated with the code), the artificial neural network 600 (and specifically, the representations of the nodes in the hidden layer 604) may be trained (adjusted) to improve its performance in entity prediction. Adjusting the artificial neural network 600 may include adjusting the weights associated with each node in the hidden layer 604.

Figure 7:
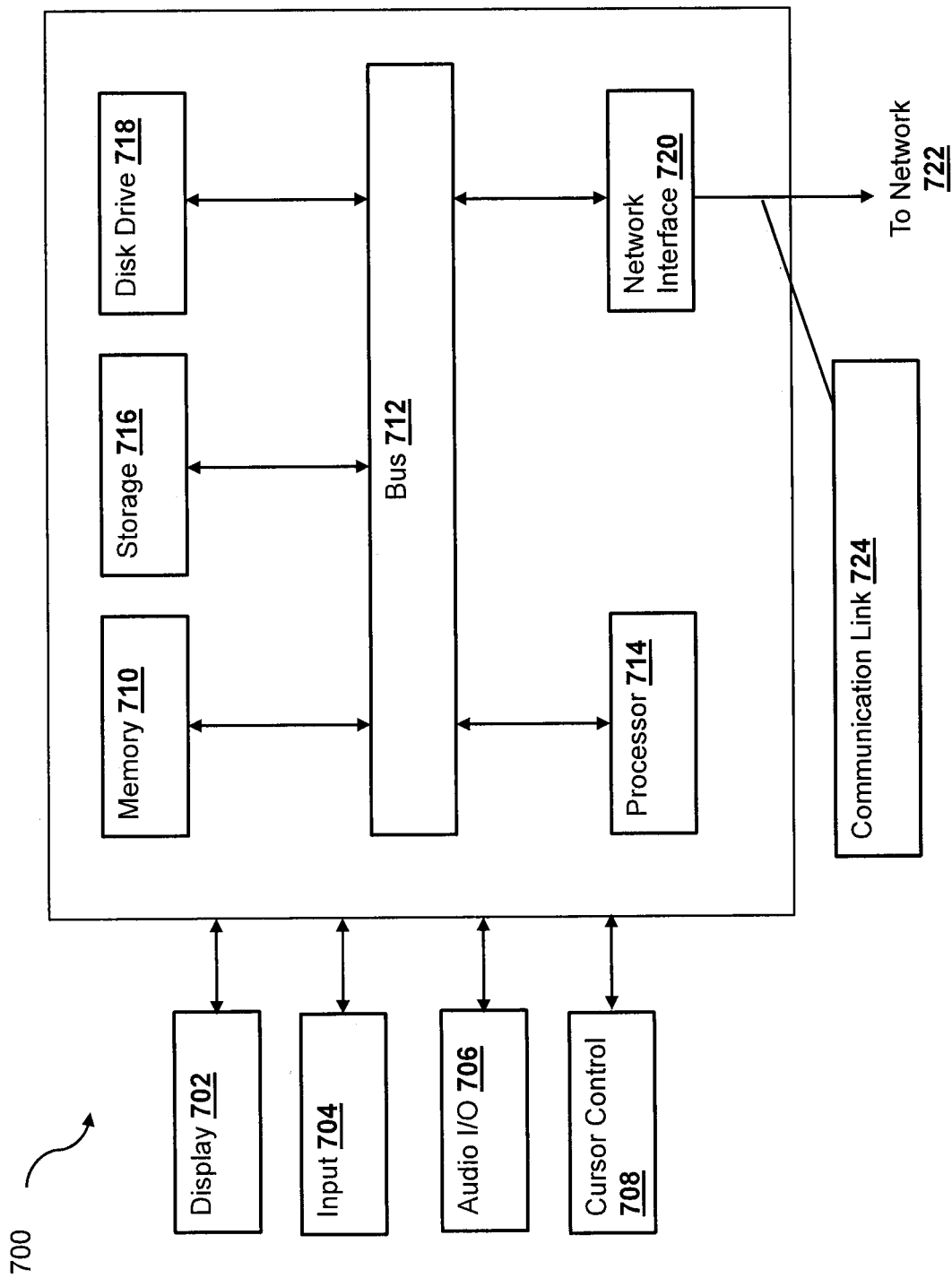
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, the entity server 150, and the user device 110. In various implementations, the user device 110 may include a mobile cellular phone, personal computer (PC), laptop, wearable computing device, etc. adapted for wireless communication, and each of the service provider server 130, the entity server 150, and the merchant server 120 may include a network computing device, such as a server. Thus, it should be appreciated that the devices 110, 120, 150, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the model generation functionalities and the entity prediction functionalities described herein according to the processes 300 and 330.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        receiving a tracking code and a particular courier identity associated with a shipment of an item, wherein the tracking code comprises a sequence of alphanumeric characters;
        deriving statistical data representing a distribution of different alphanumeric characters in the tracking code;
        embedding the tracking code in a first portion of an image comprising pixel values;
        embedding the statistical data in a second portion of the image; and
        using a machine learning model to determine a probability that the tracking code is associated with the particular courier identity among a plurality of courier identities based on the image.

2. The system of claim 1, wherein the statistical data comprises at least one of a distribution of alphabetic letters and numerals in the sequence of alphanumeric characters, a ratio between alphabetic letters and numerals in the sequence of alphanumeric characters, or a length of the sequence of alphanumeric characters.

3. The system of claim 1, wherein the operations further comprise embedding a country of origin of the shipment in the image as a pixel value.

4. The system of claim 1, wherein the statistical data comprises a distribution of alphabetic letters and numerals in the sequence of alphanumeric characters, and wherein the embedding the statistical data in the second portion of the image comprises:
    converting the sequence of alphanumeric characters into a sequence of pixel values by (i) converting each alphabetic letter in the sequence of alphanumeric characters into a first pixel value and (ii) converting each numeral in the sequence of alphanumeric characters into a second pixel value different from the first pixel value; and
    embedding the sequence of first and second pixel values into the second portion of the image.

5. The system of claim 1, wherein the statistical data comprises a ratio between alphabetic letters and numerals in the sequence of alphanumeric characters, and wherein the embedding the statistical data in the second portion of the image comprises:
    converting the ratio into a pixel value based on a pixel value range; and
    embedding the pixel value into the second portion of the image.

6. The system of claim 1, wherein the statistical data comprises a length of the sequence of alphanumeric characters, and wherein the embedding the statistical data in the second portion of the image comprises:
    converting the length into a pixel value based on a pixel value range; and
    embedding the pixel value into the second portion of the image.

7. The system of claim 1, wherein the operations further comprise:

using the machine learning model to determine, for each courier identity in the plurality of courier identities, a corresponding probability that the tracking code is associated with the courier identity based on the image; and determining that the tracking code is invalid when each of the determined probabilities is below a predetermined threshold.

8. The system of claim 1, wherein the operations further comprise:

in response to determining that the probability is above a predetermined threshold, obtaining a shipment status from a server associated with the particular courier identity.

9. A method comprising:

obtaining, by one or more hardware processors, a set of training data for training a machine learning model for associating tracking codes with one of a plurality of shipping courier, wherein each training data comprises a tracking code including a sequence of alphanumeric characters and a courier identity associated with the code;

generating, by the one or more hardware processors for each training data in the set of training data, a corresponding image by:

deriving, by the one or more hardware processors, a set of statistical characteristics from a tracking code included in the training data, wherein the set of statistical characteristics represent a distribution of different alphanumeric characters in the tracking code;

embedding the tracking code in a first portion of the corresponding image; and embedding the set of statistical characteristics in a second portion of the corresponding image; and training the machine learning model based on the images corresponding to the set of training data.

10. The method of claim 9, wherein the set of statistical characteristics comprises at least one of a distribution of alphabetic letters and numerals in the sequence of alphanumeric characters, a ratio between alphabetic letters and numerals in the sequence of alphanumeric characters, or a length of the sequence of alphanumeric characters.

11. The method of claim 9, wherein the set of statistical characteristics comprises a distribution of alphabetic letters and numerals in the sequence of alphanumeric characters, and wherein the generating the corresponding image for each training data in the set of training data further comprises:

converting the sequence of alphanumeric characters into a sequence of pixel values by converting each value in the sequence of alphanumeric characters into a first pixel value or a second pixel value based on whether the value is an alphabet or a numeral.

12. The method of claim 9, wherein the generating the corresponding image for each training data in the set of training data further comprises embedding a corresponding country of origin of a shipment indicated in the training data in the corresponding image.

13. The method of claim 9, wherein the set of statistical characteristics comprises a ratio between alphabetic letters and numerals in the sequence of alphanumeric characters, and wherein the generating the corresponding image for each training data in the set of training data further comprises:

computing the ratio based on a number of alphabetic letters in the sequence of alphanumeric characters and a number of numerals in the sequence of alphanumeric characters; and converting the ratio into a pixel value along a channel within a color space.

14. The method of claim 9, wherein the set of statistical characteristics comprises a length of the sequence of alphanumeric characters, and wherein the generating the corresponding image for each training data in the set of training data further comprises:

converting the length into a pixel value along a channel within a color space; and embedding the pixel value into the corresponding image.

15. A non-transitory machine-readable medium stored thereon machine-readable instructions executable to cause a machine to perform operations comprising:

obtaining a tracking code associated with a shipment of an item, the tracking code comprising a sequence of alphanumeric characters;

deriving statistical data representing a distribution of different alphanumeric characters in the sequence of alphanumeric characters;

embedding the tracking code in a first portion of an image comprising pixel values;

embedding the statistical data in a second portion of the image; and using a machine learning model to determine, among a plurality of shipping couriers, a particular shipping courier that is associated with the tracking code based on the image.

16. The non-transitory machine-readable medium of claim 15, wherein the operations further comprise:

using the machine learning model to determine, from the plurality of shipping couriers, a subset of shipping couriers based on the image, wherein the tracking code has a higher probability of being associated with the subset of shipping couriers than with any other shipping couriers from the plurality of shipping couriers not in the subset; and displaying the subset of shipping couriers and their corresponding probabilities to a user.

17. The non-transitory machine-readable medium of claim 15, wherein the operations further comprise:

using the machine learning model to determine, for each shipping courier in the plurality of shipping couriers, a corresponding probability that the tracking code is associated with the shipping courier based on the image; and determining that the tracking code is invalid when each of the determined probabilities is below a predetermined threshold.

18. The non-transitory machine-readable medium of claim 15, wherein the operations further comprise:

in response to determine that the tracking code is associated with the particular shipping courier, obtaining a shipment status from the particular shipping courier.

19. The non-transitory machine-readable medium of claim 18, wherein the obtaining the shipment status comprises transmitting a shipment status request comprising the tracking code to a server associated with the particular shipping courier.

20. The non-transitory machine-readable medium of claim 15, wherein the statistical data comprises at least one of a distribution of alphabetic letters and numerals in the sequence of alphanumeric characters, a ratio between alphabetic letters and numerals in the sequence of alphanumeric characters, or a length of the sequence of alphanumeric characters.

* * * * *